(12) United States Patent
Lewis (10) Patent No.: US 8,649,936 B2
(45) Date of Patent: Feb. 11, 2014

(54) METHOD AND APPARATUS FOR DETERMINING A VALUE OF A ZERO POINT OFFSET OF A YAW RATE SENSOR

(75) Inventor: Jason Lewis, Christchurch Dorset (GB)

(73) Assignee: Penny & Giles Controls Limited, Dorset (GB)

( * ) Notice: Subject to any disclaimer, the term of this patent is extended or adjusted under 35 U.S.C. 154(b) by 847 days.

(21) Appl. No.: 12/450,560

(22) PCT Filed: Mar. 31, 2008

(86) PCT No.: PCT/GB2008/001140
§ 371 (c)(1),
(2), (4) Date: Aug. 17, 2010

(87) PCT Pub. No.: WO2008/119986
PCT Pub. Date: Oct. 9, 2008

(65) Prior Publication Data
US 2011/0035097 A1    Feb. 10, 2011

(30) Foreign Application Priority Data

Mar. 30, 2007  (GB) .................................. 0706338.1

(51) Int. Cl.
*G06F 7/00* (2006.01)

(52) U.S. Cl.
USPC .......... 701/36; 701/1; 701/41; 701/71; 700/1; 700/5; 700/37; 700/67; 700/89; 348/86

(58) Field of Classification Search
USPC .......... 701/1, 41, 71; 700/1, 5, 37, 38, 39, 67, 700/68, 69, 70, 71, 72, 89, 73; 702/85, 94, 702/95, 96, 104, 142; 324/765, 754, 758, 324/158.1; 303/146; 348/86
See application file for complete search history.

(56) References Cited

U.S. PATENT DOCUMENTS

| 5,636,909 | A  | * | 6/1997  | Hirao et al. ................... 303/140 |
| 6,147,626 | A  | * | 11/2000 | Sakakibara .................... 340/988 |
| 6,314,329 | B1 | * | 11/2001 | Madau et al. ................... 700/89 |
| 6,810,311 | B2 | * | 10/2004 | Winner et al. .............. 701/29.7 |
| 6,834,218 | B2 | * | 12/2004 | Meyers et al. ..................... 701/1 |

(Continued)

FOREIGN PATENT DOCUMENTS

| GB | 2 340 611   | 2/2000  |
| GB | 2 340 611 A | 2/2000  |
| GB | 2 444 963 A | 6/2008  |
| JP | 57-200813 A | 12/1982 |

(Continued)

OTHER PUBLICATIONS

International Search Report Mailed Aug. 4, 2008 in International Application No. PCT/GB2008/001140 (1 page).

(Continued)

*Primary Examiner* — James Trammell
*Assistant Examiner* — Truc M Do
(74) *Attorney, Agent, or Firm* — Nixon & Vanderhye P.C.

(57) ABSTRACT

There is described a method for determining a value of a zero point offset of a yaw rate sensor. The method comprises measuring over time the output of the yaw rate sensor, determining whether the measured output has remained within a set of limits for a pre-determined period and if it is determined that the measured output has remained within the limits for the pre-determined period, using at least one measured value of the output to determine the value of the zero point offset.

20 Claims, 5 Drawing Sheets

(56) References Cited

U.S. PATENT DOCUMENTS

| | | | |
|---|---|---|---|
| 7,085,642 B2* | 8/2006 | Samuel et al. | 701/82 |
| 7,684,945 B2* | 3/2010 | Walter et al. | 702/96 |
| 7,920,981 B2* | 4/2011 | Fennel et al. | 702/94 |
| 8,024,147 B2* | 9/2011 | Baus | 702/104 |
| 8,090,503 B2* | 1/2012 | Lavoie et al. | 701/42 |
| 8,195,357 B2* | 6/2012 | Basnayake | 701/33.1 |
| 2001/0025210 A1 | 9/2001 | Tozu et al. | |
| 2002/0011361 A1 | 1/2002 | Richey, II et al. | |
| 2002/0046003 A1 | 4/2002 | Bustgens et al. | |
| 2003/0040856 A1* | 2/2003 | Winner et al. | 701/34 |
| 2003/0109939 A1* | 6/2003 | Burgdorf et al. | 700/38 |
| 2010/0106451 A1* | 4/2010 | Sugihara et al. | 702/147 |

FOREIGN PATENT DOCUMENTS

| | | |
|---|---|---|
| JP | 6-160415 A | 6/1994 |
| JP | 2005-181254 A | 7/2005 |
| WO | WO 2007/015137 A1 | 2/2007 |

OTHER PUBLICATIONS

Great Britain Search Report Dated Jun. 30, 2010 in Application No. GB0922597.0 (1 page).

Great Britain Search Report Dated Jul. 11, 2007 in Application No. GB0706338.1 (1 page).

International Search Report for PCT/GB2008/001140, mailed Aug. 4, 2008.

* cited by examiner

METHOD AND APPARATUS FOR DETERMINING A VALUE OF A ZERO POINT OFFSET OF A YAW RATE SENSOR

This application is the U.S. national phase of International Application No. PCT/GB2008/001140, filed 31 Mar. 2008, which designated the U.S. and claims priority to Great Britain Application No. 0706338.1, filed 30 Mar. 2007, the entire contents of each of which are hereby incorporated by reference.

The present invention relates to a method and apparatus for determining a value of a zero point offset of a yaw rate sensor.

It is well known to incorporate a yaw rate sensor, for example a gyroscope, in a vehicle's control system in order to sense the yaw rate (i.e. the rate of turn) of the vehicle when moving.

The output of a yaw rate sensor is typically a voltage signal proportional to the yaw of the vehicle in degrees per second.

The zero point offset or null value of a yaw rate sensor is the value output from the sensor when it is not turning, i.e. when the rate of turn of the sensor is zero degrees per second. Various factors contribute to the null value, in particular temperature and the null value of a sensor may vary or drift in time in dependence upon these factors. Manufactures of yaw rate sensors publish specifications stating the maximum and minimum values expected for a properly functioning yaw rate sensor under normal operating conditions.

During vehicle operation, it is standard for a vehicle control system comprising a yaw rate sensor to compensate each measured value of the yaw rate sensor's output to take account of the zero point offset of the sensor. One basic compensation method is simply to subtract from each measured value output from the sensor, a value indicative of the zero point offset of the sensor. Such compensation helps ensure that the yaw rates derived from the measurements are accurate and not too high or too low depending upon the magnitude of the zero point offset. It is therefore important that the value of the zero point offset used to make the compensations is an accurate indication of the true value of the zero point offset.

According to the present invention, there is provided a method for determining a value of a zero point offset of a yaw rate sensor, the method comprising: measuring over time the output of the yaw rate sensor, determining whether the measured output has remained within a set of limits for a pre-determined period and if it is determined that the measured output has remained within the limits for the pre-determined period, using at least one measured value of the output to determine the value of the zero point offset.

Thus, the value of the zero point offset is only determined if the output of the sensor is judged reliable. Advantageously, this increases the likelihood that the value is an accurate indication of the true zero point offset of the sensor and that the sensor is functioning correctly.

The set of limits may be a first set of limits determined in dependence upon at least one measured value of the output of the yaw rate sensor.

The first set of limits may comprise an upper limit and a lower limit, the upper limit being set a pre-determined amount higher than a value determined in dependence upon the at least one measured value and the lower limit being set at a pre-determined amount lower than the value determined in dependence upon the at least one measured value.

Thus the upper limit and the lower limit of the first set of limits can respectively be set at values above and below an initial measured value of the output. If the value of the measured output then remains within the boundaries defined by these limits for the pre-determined period, then the output is taken as being stable.

In one embodiment the values of the upper and lower limits of the first set can vary over the pre-determined period in dependence upon a monitored average value of the measured output.

Alternatively, the set of limits may be a second set of limits having pre-determined upper and lower values, independent of any measured value of the output, for example, manufacturer recommended permissible upper and lower values for the zero point offset of the sensor.

Only determining the value for the zero point offset if the measured output remains within recommended permissible upper and lower values for the pre-determined time period helps ensure that the value has been determined from a sensor that is functioning correctly.

In a preferred embodiment it is determined whether the measured output has remained within the first set of limits and the second set of limits for the pre-determined period and only if it is determined that the measured output has remained within both sets of limits for the pre-determined period is the value of the zero point offset determined.

In a preferred embodiment, the method is implemented by a vehicle control system which as a safety feature prevents the vehicle from being operable until the value of the zero point offset is determined. The vehicle may for example be an electrically powered vehicle such as a wheelchair.

According to the invention there is also provided apparatus comprising an arrangement for implementing the method described above.

According to another aspect of the invention there is provided a method of operating a vehicle comprising a control system comprising a yaw rate sensor, in which method the control system measures the output of the yaw rate sensor when the vehicle is at rest, tests the measured output in accordance with test criteria to determine if the measured output is reliable, and in response to determining that the measured output is reliable uses the measured output to determine a value for a zero point offset of the yaw and inhibits the vehicle from being operational until after it has determined the value for the zero point offset.

Embodiments of the invention will now be described by way of example only with reference to the accompanying drawing in which.

Figure 1:
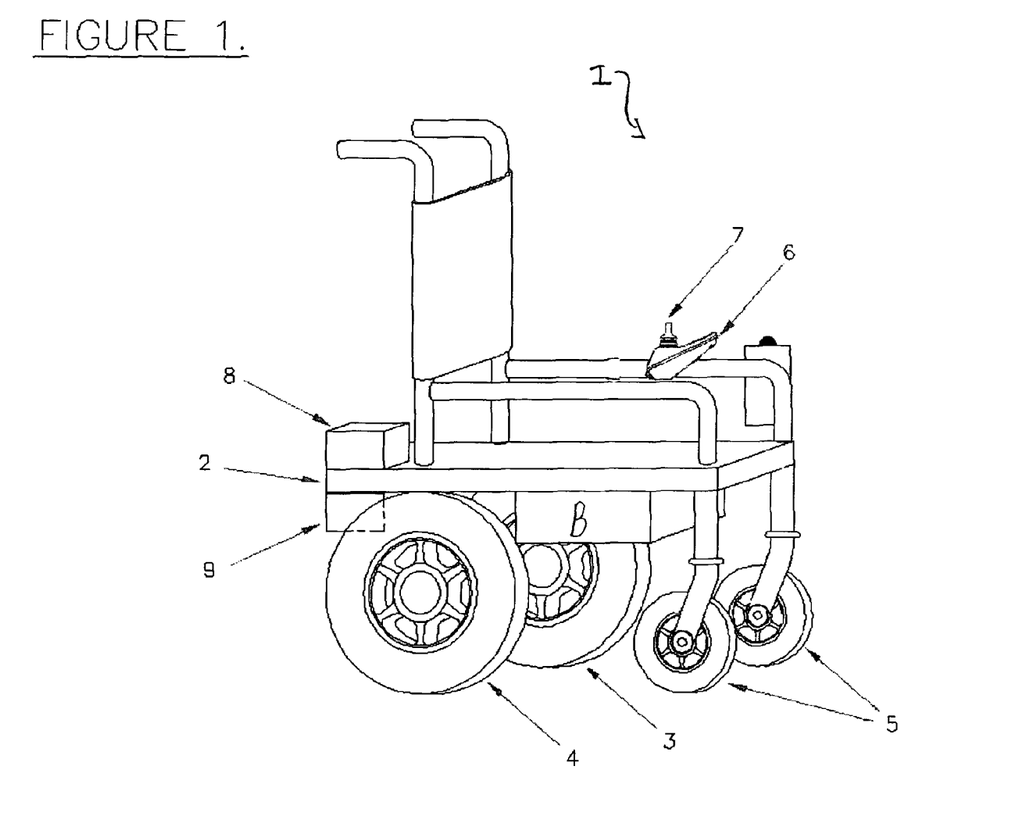
FIG. 1 is a schematic diagram of a wheelchair.

Referring to FIG. 1, an electrically powered wheelchair 1 comprises a chassis 2, a rear driven left wheel 3, a rear driven right wheel 4 and a pair of leading castors 5. The wheelchair 1 is also provided with two independently driven electric motors (not shown) for driving the rear left 3 and rear right 4 wheels. A battery (B) provides power for the wheelchair 1.

A user control input model 6 comprising an input device 7, typically in the form of a joystick, provides a means by which a user (not shown) can input forward/reverse speed demand signals and angular rate of turn demand signals to the wheelchair. The user input forward/reverse speed demand signals and yaw rate demand signals indicate the user's desired forward/reverse speed and yaw rate respectively for the wheelchair. By manipulating the input device 7, a user can thus cause the wheelchair to move forwards or backwards and to turn left or right.

A yaw rate sensor module comprising a yaw rate sensor 8 is fitted to the wheelchair chassis 2 to measure the actual yaw rate of the wheelchair 1 and to generate a signal indicative of this actual yaw rate.

A control module 9, also fitted to the chassis 2 receives user forward/reverse speed demand signals from the input module 6 and actual yaw rate signals from the sensor 8. The control module 9 processes the received signals and uses the processed signals to control the right and left motors (not shown) of the wheelchair 1.

As is explained in more detail in our co-pending application GB0623895.0, the control module 9 compares the yaw rate demanded by the user with the yaw rate signal produced by the sensor 8 to generate an error signal based on the difference between the two. The control module passes the error signal through a closed control loop to generate a correction yaw demand signal for applying to the motors to reduce any heading error of the wheelchair 1.

Figure 2:
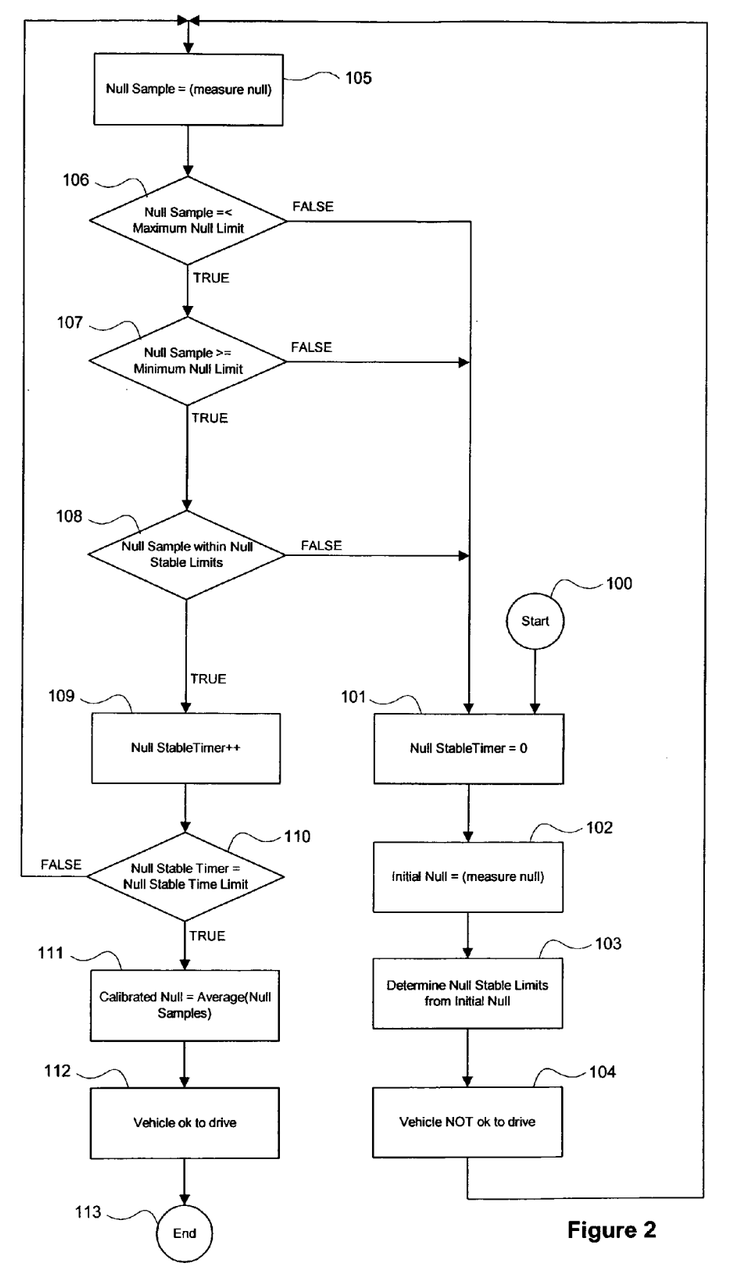
FIG. 2 is a flow diagram illustrating a method embodying the invention.

FIG. 2 illustrates a flow diagram of the method steps implemented by the control module 9 to determine the null value of the yaw rate sensor 8 in an embodiment of the invention. When a user activates the control module 9, for example by turning on the input module 6, the wheelchair 1 is initially prohibited from being driven until the control model 9 successfully determines and validates the yaw rate sensor's 8 null value. The calibration procedure involves taking repeated measurements of the yaw rate sensor's 8 output when the wheelchair 1 is at rest and comparing each measurement to two pairs of limits. If the sensor's 8 output remains within both of the two pairs of limits for a pre-determined period, then the yaw rate sensor's 8 null value is determined. The calibration process is re-started if the yaw rate sensor's 8 output is found to be outside either of the two pairs of limits at any time during the calibration process. The wheelchair 1 is only allowed to be driven when the calibration process has been completed successfully.

The calibration process begins as soon as the control module 9 is activated, step 100. Step 101 then initialises to zero a counter or Null Stable Timer. As will be described below, the Null Stable Timer is to be incremented each time a series of tests performed by the process is successful or is re-set to zero if that series of tests is not performed successfully.

At step 102, the process takes an initial measurement of the yaw rate sensor's 8 null value and at step 103 determines a pair of Null Stable Limits based on the initial measurement of the yaw rate sensor's 8 null value. The respective values of the Null Stable limits are set at being slightly above and slightly below the initial measurement of the yaw rate sensor's 8 null value, for example 3 degrees per second above and below the initial measurement.

At step 104 the process signals that the yaw rate sensor null calibration has not yet been successfully completed and so the control module 9 continues to prohibit the wheelchair 1 from being driven.

At step 105, a measurement of the current value of the yaw rate sensor's 8 null output is taken. At step 106 the process determines if the current measured value is less than or equal to a maximum allowed null limit. The maximum null limit may for example be the maximum null value specified in the manufacture's data sheet for the yaw rate sensor 8. If the outcome of step 106 is FALSE (i.e. the current measured value is greater than the maximum null value), the current measured value is taken as being un-reliable and the method returns to step 101 for calibration to start afresh.

If the outcome of step 106 is TRUE, the process passes to step 107, which determines if the current measured value is greater than or equal to a minimum allowed null limit. The minimum null limit may for example be the minimum null value specified in the manufacture's data sheet for the yaw rate sensor 8. If the outcome of step 106 is FALSE (i.e. the current measured value is less than the minimum null value), the current measured value is taken as being un-reliable and the method returns to step 101 for calibration to start afresh.

If the outcome of step 107 is TRUE, the process passes to step 108. At step 108, the process determines if the current measured value is also within the range defined by the Null Stable Limits determined in step 103. Generally, the yaw rate sensor's 8 output will be relatively stable in value provided that the wheelchair is motionless and the yaw rate sensor 8 is functioning correctly. The range defined by the Null Stable limits is selected such that a FALSE result for step 108 is likely indicative that the wheelchair 1 is not motionless and/or the yaw rate sensor 8 is not functioning correctly or stably. Thus, if the outcome of step 108 is FALSE, the process returns to step 101 for calibration to start afresh. It will be appreciated that if the measured value used in step 108 is that obtained in step 102 (i.e. the value used to determine the Null Stable Limits), then the outcome of step 108 must be TRUE.

If the outcome of step 108 is TRUE, the process passes to step 109 which increments the Null Stable Timer by one to indicate that the tests performed by steps 104, 105 and 106 have all proven successful.

The process then passes to step 110 which tests the Null Stable Timer to determine if it has reached a pre-determined Null Stable Time Limit. If the outcome of step 110 is FALSE, the yaw rate sensor output has not remained stable for the period defined by the Null Stable Time Limit. In this event the process returns to step 105 for a new measurement value of the yaw rate sensor's 8 null output to be taken and for the process to start again using the new measurement value from step 105 onwards.

If the outcome of step 110 is TRUE, the yaw rate sensor output has remained stable for the period defined by the Null Stable Time Limit and the calibration process is deemed successful. In this event, the process passes to step 111.

The time period defined by the Null Stable Time Limit is programmable and is set at a value appropriate for the yaw rate sensor under test. In one example, a newly measured value of the yaw rate sensor's 8 null output is input to step 105 every 10 ms and the Null Stable Timer must be incremented from zero to fifty for the outcome of step 109 to be passed TRUE. Thus in this example, the Null Stable Time Limit is 500 ms.

Step 111 calculates the average null value using all the measured values or samples taken to increment the Null Stable Timer to the Null Stable Time Limit and uses this average value as the calibrated null value.

Step 112 signals that the yaw rate sensor null calibration has been successful and the control module 9 now allows the wheelchair 1 to be driven.

Step 113 ends the calibration process.

Figure 3:
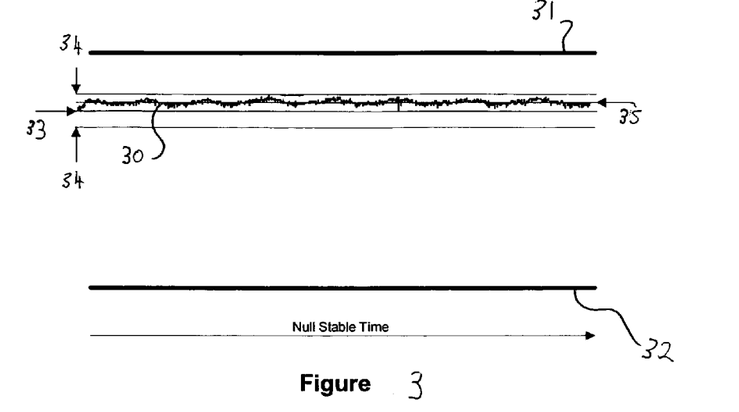
FIG. 3 is a plot of measured values of the zero point offset of the sensor obtained using the method illustrated in FIG. 2.

Referring now to FIG. 3, there is illustrated in graph format a plot 30 of measured values of the yaw rate sensor output over time during a successful calibration process. The pre-determined maximum and minimum null limits are illustrated respectively as lines 31 and 32, and the Null Stable limits as calculated with reference to the initial null measurement 33, are illustrated as lines 34. The average of the measured values is illustrated as line 35. As the sampled values 30 remain within the Null Stable Limits 34 for the duration of the Null Stable Time Limit, the calibration is successful. The average value 35 of the samples taken during the calibration process is used as the calibrated null value for the control system of the vehicle.

Figure 4:
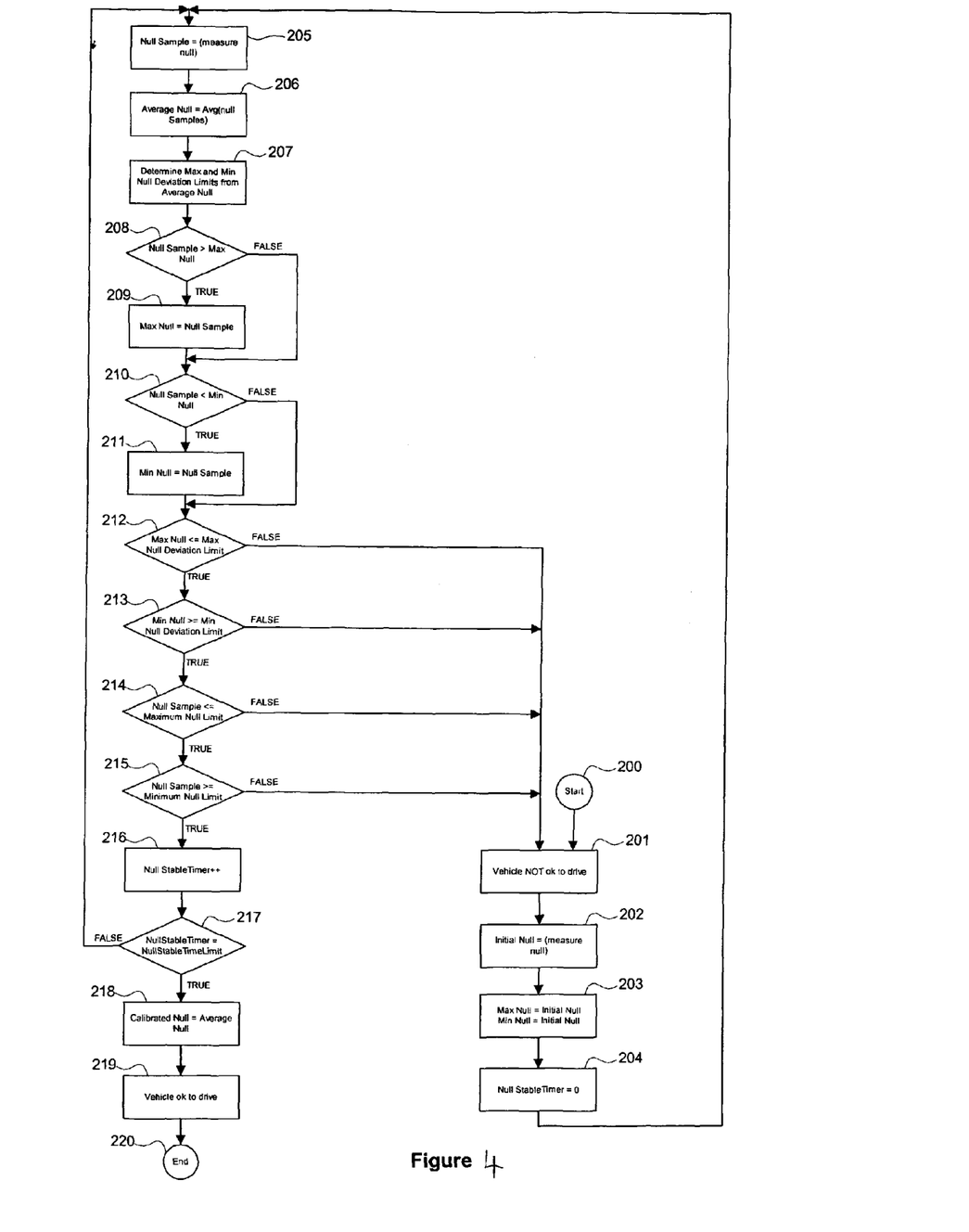
FIG. 4 is a flow diagram illustrating a second method embodying the invention.

Referring to FIG. 4, there is illustrated a flow diagram of the method steps implemented by the control module 9 to determine the null value of the yaw rate sensor 8 in a second embodiment of the invention.

The calibration process begins as soon as the control module 9 is activated, step 200, and at step 201, the process signals that the yaw rate sensor null calibration has not yet been successfully completed and so the control module 9 continues to prohibit the wheelchair 1 from being driven. At step 202, the process takes an initial measurement of the yaw rate sensor's 8 null value and at step 203 initialises a Maximum determined null value and a Minimum determined null value as both being equal to this initial null measurement. At step 204 the process then initialises the counter or Null Stable Timer to zero.

At step 205, a measurement of the current value of the yaw rate sensor's 8 null output is taken. At step 206, the process calculates the current average value of the yaw rate sensor's output, based on the current number of measurements obtained by the process since step 204.

At step 207, the process determines a pair of Null Stable Limits based on the determined current average value of yaw rate sensor's 8 output. The respective values of the Null Stable limits are set at being slightly above and slightly below this current average value, for example, 3 degrees per second above and below the average value.

At step 208, the process determines if the current measured value is greater than the current stored Maximum null value. If the outcome of Step 208 is TRUE the process passes to Step 209, but if the outcome is FALSE the process passes to Step 210.

At Step 209, the currently stored Maximum null value is updated as being the current measured value.

From Step 209, the process passes to Step 210. At Step 210, the process determines if the current measured value is less than the current stored Minimum null value. If the outcome of Step 210 is TRUE the process passes to Step 211, but if the outcome is FALSE the process passes to Step 212.

At Step 211, the currently stored Minimum null value is updated as being the current measured value.

From Step 211, the process passes to Step 212.

At Step 212, the process determines if the current Maximum null value is less than or equal to the upper null stable limit. If the outcome of Step 212 is FALSE, the yaw rate sensor null output is taken as being un-reliable and the process returns to Step 201 for calibration to start afresh. If the outcome of Step 212 is TRUE, the process passes to Step 213.

At Step 213, the process determines if the current Minimum null value is greater than or equal to the lower null stable limit. If the outcome of Step 213 is FALSE, the yaw rate sensor null output is taken as being un-reliable and the process returns to Step 201 for calibration to start afresh. If the outcome of Step 213 is TRUE, the process passes to Step 214.

At Step 214 the process determines if the current measured value is less than or equal to a maximum allowed null limit. As in the process illustrated in FIG. 2, the maximum null limit may for example be the maximum null value specified in the manufacture's data sheet for the yaw rate sensor 8. If the outcome of step 214 is FALSE (i.e. the current measured value is greater than the maximum null value), the current measured value is taken as being un-reliable and the method returns to stepp 201 for calibration to start afresh.

If the outcome of step 214 is TRUE, the process passes to step 215, which determines if the current measured value is greater than or equal to a minimum allowed null limit. Again, the minimum null limit may for example be the minimum null value specified in the manufacture's data sheet for the yaw rate sensor 8. If the outcome of step 215 is FALSE (i.e. the current measured value is less than the minimum null value), the current measured value is taken as being un-reliable and the method returns to step 201 for calibration to start afresh.

If the outcome of step 215 is TRUE, the process passes to step 216 which increments the Null Stable Timer by one to indicate that the tests performed by steps 212, 213, 214 and 215 have all proven successful.

The process then passes to step 216 which tests the Null Stable Timer to determine if it has reached the pre-determined Null Stable Time Limit. If the outcome of step 216 is FALSE, the yaw rate sensor output has not remained stable for the period defined by the Null Stable Time Limit. In this event the process returns to step 205 for a new measurement value of the yaw rate sensor's 8 null output to be taken and for the process to start again using the new measurement value from step 205 onwards.

If the outcome of step 217 is TRUE, the yaw rate sensor output has remained stable for the period defined by the Null Stable Time Limit and the calibration process is deemed successful. In this event, the process passes to step 218 stores the average null value calculated in step 206 and uses this average value as the calibrated null value.

Step 219 signals that the yaw rate sensor null calibration has been successful and the control module 9 now allows the wheelchair 1 to be driven.

Step 220 ends the calibration process.

Figure 5:
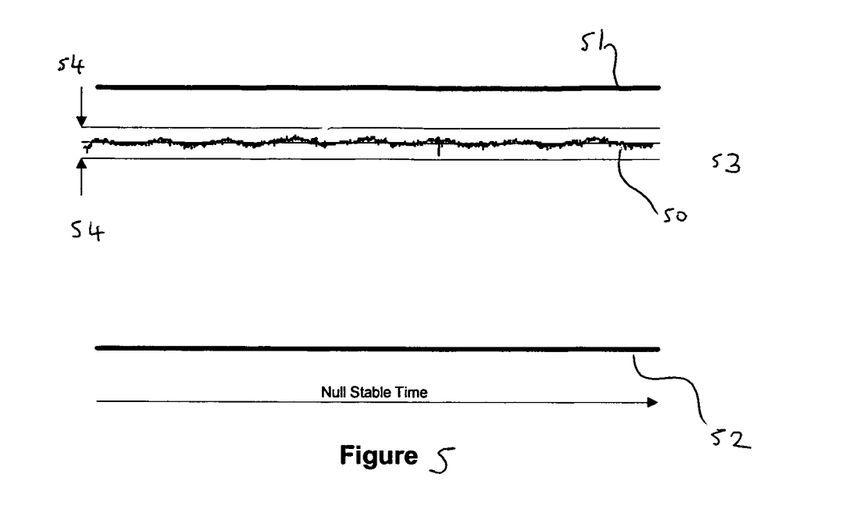
FIG. 5 is plot of measured values of the zero point offset of the sensor obtained using the method illustrated in FIG. 4.
Figure 7:
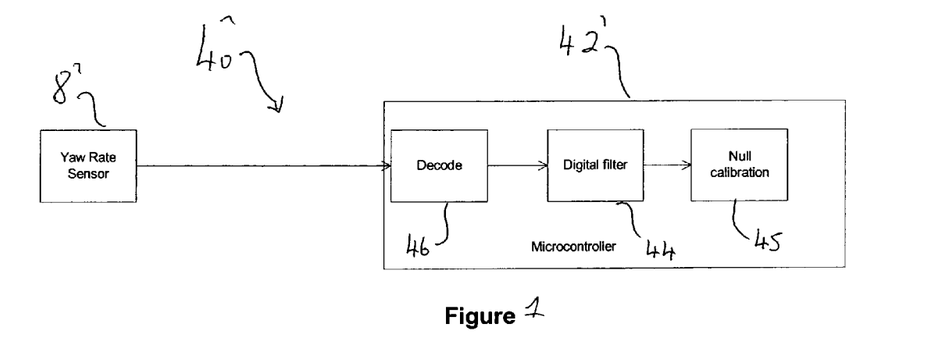

Referring now to FIG. 5, there is illustrated in graph format a plot 50 of measured values of the yaw rate sensor output over time during a successful calibration process using the method illustrated in FIG. 4. The pre-determined maximum and minimum null limits are illustrated respectively as lines 51 and 52, and the Null Stable limits as calculated with reference to the average 53 of the measured values are illustrated as lines 54. Throughout the calibration process, the Null Stable Limits 54 always align centrally with the average 53 of the measured values. The average 53 may vary as the calibration progresses and so the Null Stable Limits 54 may vary as well. FIG. 7 illustrates a successful calibration process and so the Null Stable limits are illustrated at their final values as determined with reference to the final average of the measured values. This final average 53 of the measured values is used as the calibrated null value for the control system of the vehicle.

Figure 6:
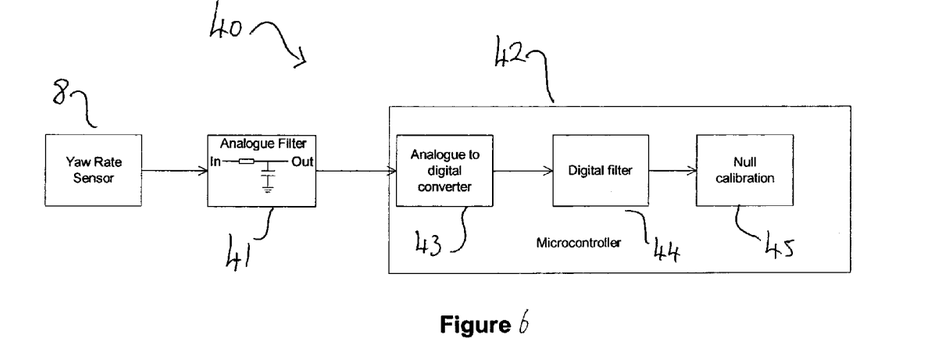
FIGS. 6 and 7 illustrate schematically systems for implementing the methods illustrated in FIGS. 2 and 4.

Referring now to FIG. 6, there is illustrated a control system 40 for receiving the output of yaw rate sensor 8 and performing the method illustrated in FIG. 2 or the method illustrated in FIG. 4. In this example the yaw rate sensor 8 outputs an analogue signal. The control system 40 comprises analogue filter 41 and a microcontroller 42 and forms part of the control module 9 illustrated in FIG. 1. The microcontroller 42 comprises analogue to digital converter 43, a digital filter 44 and a Null calibration processor 45.

The analogue zero point offset voltage signal output from the yaw rate sensor 8 is first filtered by the analogue filter 41 to reduce noise and then input to the analogue to digital converter 43. This generates a digital signal representing a series of sampled or measured values of the zero point offset for use in the calibration process. This digital signal is further filtered by the digital filter 44 and then input to the Null calibration processor 45 which is programmed to process the signal to implement the calibration method described with respect to FIG. 2 of FIG. 4. The sampling and digital filtering is performed at a higher execution frequency than that of the calibration process to reduce the noise of the null samples used in the calibration process.

Referring now to FIG. 7, there is illustrated a corresponding control system 40' for receiving the output of a digital yaw rate sensor 8' and performing the method illustrated in FIG. 2 or FIG. 4. The control system 40' is similar to the control system 40 and like functioning components in both systems are given the same reference numerals in the Figures.

The yaw rate sensor 8' outputs a digital signal representing a series of measured values of the zero point offset and hence there is no requirement in control system 40' for the analogue filter 41 and the analogue to digital converter 43 of the control system 40. Instead, the Microcontroller 42' comprises a decoder 46 which is a peripheral, for example, a CAN (Controller Area Network) or SPI (Serial Peripheral Interface) for decoding the digital output of the sensor 8' so it can be used in the calibration process and inputting the decoded signal to the digital filter 44. The digital filter 44 and the null calibration processor 45 function as described above with reference to FIG. 6.

Various alternatives or additions to the above described embodiments may be envisaged. For example, in both embodiments the calibration process uses the null stable limits (which are calculated in dependence upon at least one measured value of the output of the yaw rate sensor) and the maximum/minimum null limits (which are independent of the sensor's output). It will be appreciated that other embodiments of the invention may instead make use of only one or other of these pairs of limits in the calibration process, or limits calculated or determined in other alternative ways.

It will also be appreciated that the value for the zero point offset calculated at the end of a successful calibration process need not be the average of the values obtained during the calibration process. For example, one of the values obtained during the calibration process may be adopted as the zero point offset.

Having thus described the present invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements.

The invention claimed is:

1. A method of controlling operation of a vehicle comprising the steps of:
   determining a value of a zero point offset of a yaw rate sensor by:
   measuring over a pre-determined period of time an output of the yaw rate sensor,
   determining whether the measured output has remained within a first set of limits and a second set of limits for the pre-determined period of time, and
   using at least one measured value of the output to determine the value of the zero point offset when it is determined that the measured output has remained within the first set of limits and the second set of limits for the pre-determined period of time; and
   preventing driving of the vehicle until the zero point offset has been determined.

2. A method according to claim 1, the method further comprising, using a timer or counter to determine whether the pre-determined period has been reached.

3. A method according to claim 1, wherein the step of using at least one measured value of the output to determine the value of the zero point offset comprises, calculating an average value of a plurality of measured values of the output and using the average value as the value of the zero point offset.

4. A method according to claim 1, wherein the first set of limits is determined in dependence upon at least one measured value of the output of the yaw rate sensor.

5. A method according to claim 4, wherein the first set of limits comprises an upper limit and a lower limit, the upper limit being set a predetermined amount higher than a value determined in dependence upon the at least one measured value and the lower limit being set at a pre-determined amount lower than the value determined in dependence upon the at least one measured value.

6. A method according to claim 4, wherein the first set of limits comprises an upper limit and a lower limit, the upper limit being set a predetermined amount higher than the at least one measured value and the lower limit being set at a predetermined amount lower than the at least one measured value.

7. A method according to claim 4, wherein the first set of limits comprises an upper limit and a lower limit the values of which vary over the pre-determined period in dependence upon variations in the measured output.

8. A method according to claim 7, wherein the values of the upper and lower limits of the first set of limits vary over the pre-determined period in dependence upon a monitored average value of the measured output.

9. A method according to claim 8, wherein the values of the upper and lower limits of the first set of limits are respectively maintained a pre-determined amount above and below the monitored average value of the measured output.

10. A method according to claim 1, wherein the step of determining whether the measured output has remained within the first set of limits for the pre-determined period comprises obtaining a sequence of values of the measured output and for each value in the sequence, determining whether it is within the limits, prior to the next value in the sequence being obtained.

11. A method according to claim 7 wherein the step of determining whether the measured output has remained within the first set of limits for the pre-determined period comprises obtaining a sequence of values of the measured output and for each value in the sequence, determining whether current maximum and minimum values of the sequence are within current determined values of the limits, prior to the next value in the sequence being obtained.

12. A method according to claim 1, wherein the second set of limits have pre-determined upper and lower values that are independent of the measured output.

13. A method according to claim 12 wherein the pre-determined upper and lower values of the second set of limits are recommended permissible upper and lower values for the zero point offset of the sensor.

14. A method according to claim 1, wherein the method is ended and then started afresh if it is determined that the measured output is outside the first set of limits or the second set of limits.

15. A method according to claim 1, wherein the method is implemented by a vehicle control system which prevents the vehicle from being drivable until the value of the zero point offset is determined.

16. A vehicle control system for determining a value of a zero point offset of a yaw rate sensor, the system arranged to measure over time an output of a yaw rate sensor, the system comprising:
   a control module programmed to determine whether the measured output has remained within a first set of limits and a second set of limits for a pre-determined period of time and further programmed to use at least one measured value of the output to determine the value of the zero point offset when the control module determines that the measured output has remained within the first set of limits and the second set of limits for the pre-determined period of time.

17. A vehicle control system according to claim 16, wherein the first set of limits is determined in dependence upon at least one measured value of the output of the yaw rate sensor.

18. A vehicle control system according to claim 17, wherein the second set of limits have pre-determined upper and lower values that are independent of the measured output.

19. A vehicle comprising:
   a vehicle control system according to claim 16.

20. A vehicle according to claim 19, wherein the vehicle control system is programmed to render the vehicle undrivable until the value of the zero point offset is determined.

\* \* \* \* \*